July 16, 1963
L. KAFOURE ETAL
3,097,888
WHEEL COVER CONSTRUCTION
Filed June 20, 1961
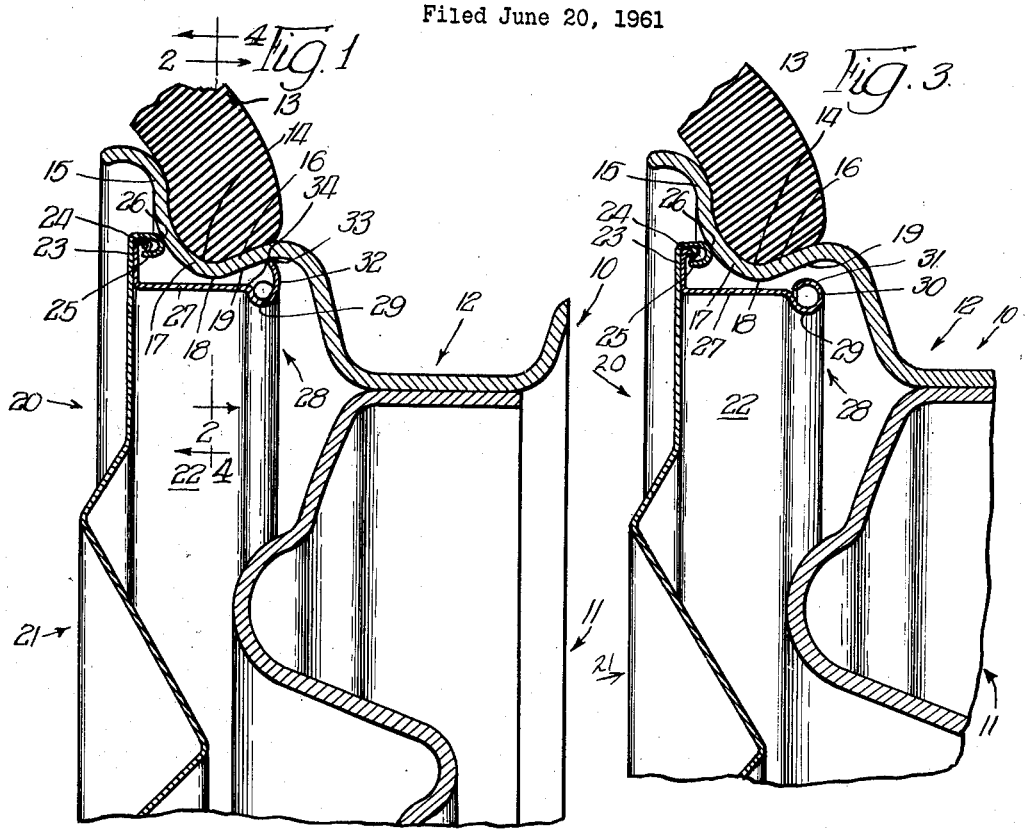
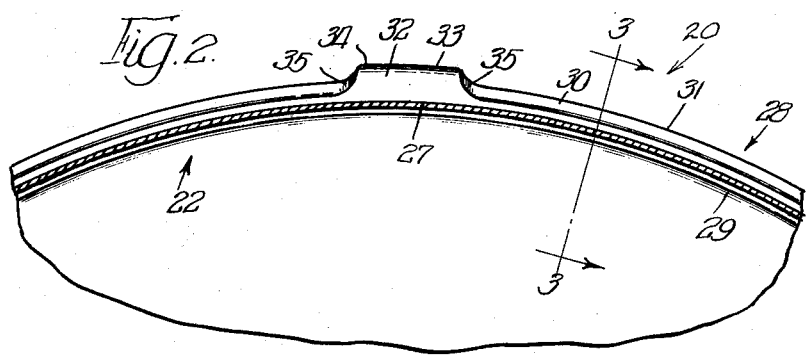
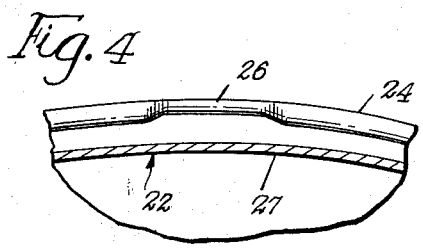
INVENTORS
Lewis Kafoure,
BY Robert E. Huffman,
Robert R. Lockwood
Atty United States Patent Office 3,097,888
Patented July 16, 1963

3,097,888
WHEEL COVER CONSTRUCTION
Lewis Kafoure and Robert E. Huffman, Valdosta, Ga., assignors to Thompson Industries, Inc., Indianapolis, Ind., a corporation of Massachusetts
Filed June 20, 1961, Ser. No. 118,343
1 Claim. (Cl. 301—37)

This invention relates to the construction of detachable covers for automobile wheels and constitutes an improvement over the invention disclosed in application Serial No. 118,036, filed June 19, 1961.

Among the objects of this invention are: To provide for holding a detachable wheel cover in place on an automobile wheel in a new and improved manner; and to increase the holding ability of retaining tooth portions located on a reinforcing bead along the distal edge of a retaining ring of a wheel cover by positioning the distal edges of the retaining tooth portions such that they engage and tend to dig into the juxtaposed wheel cover retaining surface on the automobile wheel.

In the drawings:

FIG. 1 is a vertical sectional view through an automobile wheel of conventional construction having applied thereto a wheel cover embodying the present invention.

FIG. 2 is a vertical sectional view taken generally along the line 2—2 of FIG. 1 and showing only the retaining ring on the wheel cover.

FIG. 3 is a vertical sectional view taken generally along the line 3—3 of FIG. 2 and showing, in addition, the portion of the automobile wheel and a portion of the tire mounted thereon.

FIG. 4 is a vertical sectional view taken generally along the line 4—4 of FIG. 1 and showing only portions of the retaining ring and the wheel cover.

Referring now particularly to FIGS. 1 and 3 of the drawings, it will be observed that the reference character 10 designates, generally, a portion of an automobile wheel of conventional construction having a central portion, indicated at 11, that is welded about its periphery to a drop center rim, indicated at 12, that is arranged to receive a conventional automobile tire 13 of which only a portion of a side wall is shown. The side wall of the tire 13 interfits with a groove 14 that is formed between a marginal outwardly inclined annular flange 15 and an intermediate radially outwardly inclined rim section 16 which together provide a convex annular rib 17. The convex annular rib 17 has its innermost surface 18 lying along a circle to which reference will be made presently. Also reference will be made to an inclined wheel cover retaining surface 19 that is located on the inner side of the rim section 16.

Arranged for detachable mounting on the automobile wheel 10 is a wheel cover that is shown, generally, at 20. The wheel cover 20 includes a front face 21 that is die shaped into a pleasing design and it overlies the central portion 11 of the wheel 10 and a major portion of the rim 12. Extending laterally from the front face 21 is a retaining ring that is indicated, generally, at 22. The retaining ring 22 can be formed integrally with the front face 21 or as a separate part and secured thereto as disclosed herein. The retaining ring 22 has an annular outwardly extending flange 23 which overlies the inner side of the front face 21 near its periphery. The flange 23 has a marginal flange bead 24 over which an outer edge 25 of the front face 21 is rolled to securely hold the retaining ring 22 in position on the front face 21. Retaining tooth portions 26 are formed at spaced locations along the rolled outer edge 25 of the front face 21 for the purpose of spacing it from the juxtaposed surface of the marginal flange 15.

The retaining ring 22 has a cylindrical intermediate section 27 that extends underneath the innermost surface 18 of the convex annular rib 17 and has an outer diameter that is appreciably less than the diameter of the circle along the innermost surface 18. Along its distal edge the intermediate section 27 has a reinforcing bead 28 which includes an inturned section 29 that merges with an out turned section 30. The construction is such that the outermost surface 31 of the reinforcing bead 28 lies along a circle the diameter of which approaches or is substantially the same as the diameter of the innermost surface 18 of the convex annular rib 17. At spaced locations along the reinforcing bead 28 retaining tooth portions 32 are formed by suitably shaping the out turned section 30. The retaining tooth portions 32 are spaced equally along the reinforcing bead 28 and may be of any desired number, for example six. The formation of the retaining tooth portions 32 is such that a circle along the outermost surfaces 33 thereof has a diameter that is substantially greater than the diameter of the circle along the innermost surface 18 of the convex annular rib 17. In addition the edge 34 of each retaining tooth portion 32 is relatively thin in order to increase the frictional resistance between the retaining tooth portions 32 and the inclined wheel cover retaining surface 19 and to cause them to tend to dig into this surface. It will be noted that each retaining tooth portion 32 has curved ends 35 along which it merges into the body of the out turned section 30 of the reinforcing head 28. This improves the rigidity of each of the retaining tooth portions 32 and reduces the likelihood that they will be deformed permanently on withdrawal of the wheel cover 20 from the wheel 10.

As pointed out, the diameter of the circle along the outermost surfaces 33 of the retaining tooth portions 32 is greater than the diameter of the circle along the innermost surface 18 of the convex annular rib 17. In the fully applied position of the wheel cover 20, as shown in FIG. 1, the edges 34 of the retaining tooth portions 32 engage the inclined wheel cover retaining surface 19 and apply forces radially outwardly thereagainst with the result that the wheel cover 20 is held tightly in position and is not likely to come off under normal operating conditions. The holding force of the retaining tooth portions 32 is derived not only from the cantilever spring effect of the cylindrical intermediate section 27 at the locations where the retaining tooth portions 32 are formed but also from the hoop strength of the continuous reinforcing bead 28. Because of the inclination of the wheel cover retaining surface 19 and the engagement of the edges 34 of the retaining tooth portions 32 therewith, when sufficient force is applied to the wheel cover 20 to remove it intentionally, these forces are increased but can be overcome on application of sufficient force to dislodge the wheel cover 20. Under normal operating conditions this relationship tends to hold the wheel cover 20 in place. Moreover, since the edges 34 of the retaining tooth portions 32 extend along portions that are inclined outwardly and axially away from the center of the wheel 10, they provide a digging effect into the juxtaposed portions of the wheel cover retaining surface 19 as the wheel cover 20 moves axially away from the fully applied position. Thus with the spring force, as described, working with the coefficient of friction and the digging effect of the retaining tooth portions 32, movement of the wheel cover 20 axially away from the wheel 10 is resisted and the wheel cover 20 remains tightly in position under normal service conditions.

It is observed that the wheel cover 20, constructed as described herein, can be employed with a wheel construction in which, instead of employing the inclined wheel cover retaining surface 19, there is a corresponding annular surface of cylindrical configuration. In such an arrangement, while there would be no increase in retaining force resulting from the interaction with an inclined surface, the edges 34 of the retaining tooth portions 32 would tend to increase the coefficient of friction and thus exert a holding action on the wheel cover 20 when it is used with such a modified construction.

In placing the wheel cover 20 in position on the wheel 10, the retaining tooth portions 32 first strike the lower portion of the surface of the marginal outwardly inclined annular flange 15, adjacent the position where the diameter of the innermost surface 18 of the convex annular rib 17 approaches the diameter of the outermost surface 31 of the reinforcing bead 28. Further movement of the wheel cover 20 toward the fully applied position depresses the retaining tooth portions 32. Since the reinforcing bead 28 cannot be reduced in perimeter, the motion of the retaining tooth portions 32 radially inwardly causes the reinforcing bead 28 between the retaining tooth portions 32 to move outwardly radially in order to maintain this constant perimeter. Because the reinforcing bead 28 through its hoop strength tends to assume the circular shape, it reacts through the retaining tooth portions 32 with restraining forces that are transmitted to the wheel cover retaining surface 19 and thence to the wheel 10. Because of the inclination of the retaining tooth portions 32 with respect to the surfaces of the flange 15 and rim section 16, when the wheel cover 20 is moved toward the fully applied position, no digging action of the edges 34 of the retaining tooth portions 32 takes place. Thus the wheel cover 20 can be readily applied with a minimum of force but a substantially greater force must be applied in the reverse direction to remove it from the wheel 10.

What is claimed as new is:

In combination:

(a) an automobile wheel having a tire receiving rim provided with a convex radially inwardly facing annular rib having a radially outwardly inclined wheel cover retaining surface on its inner side, (b) a wheel cover overlying said wheel on the outer side of said rib and having an annular retaining ring extending laterally from near the peripheral edge thereof in radially inwardly spaced relation to and beyond said convex annular rib, (c) a bead along the distal edge of said retaining ring constituting an integral extension thereof and spaced from said convex annular rib, (d) said bead having an inturned section extending immediately from said ring and merging with an outturned section and forming therewith a circular cross section the outermost surface of which lies along a circle whose diameter is substantially the same as the inner diameter of said annular rib, and (e) a plurality of retaining tooth portions integral with and spaced along said outturned section of said bead having their outermost edges along a circle whose diameter is slightly greater than said inner diameter of said annular rib and frictionally gripping said wheel cover retaining surface thereof.

References Cited in the file of this patent

UNITED STATES PATENTS

| | | |
|---|---|---|
| D. 103,739 | Pattison | Mar. 23, 1937 |
| 2,535,081 | Lyon | Dec. 26, 1950 |
| 2,809,076 | Plotkin | Oct. 8, 1957 |
| 2,860,922 | Lyon | Nov. 18, 1958 |
| 2,860,923 | Lyon | Nov. 18, 1958 |
| 2,870,879 | Gaylord et al. | Jan. 27, 1959 |

FOREIGN PATENTS

| | | |
|---|---|---|
| 1,041,268 | France | May 27, 1953 |